United States Patent
Vedantham et al.

(10) Patent No.: US 8,885,505 B2
(45) Date of Patent: Nov. 11, 2014

(54) NON-BEACON NETWORK COMMUNICATIONS USING FREQUENCY SUBBANDS

(75) Inventors: Ramanuja Vedantham, Allen, TX (US); Kumaran Vijayasankar, Dallas, TX (US); Anand G. Dabak, Plano, TX (US); Badri N. Varadarajan, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 274 days.

(21) Appl. No.: 13/457,590

(22) Filed: Apr. 27, 2012

(65) Prior Publication Data

US 2012/0275326 A1    Nov. 1, 2012

Related U.S. Application Data

(60) Provisional application No. 61/480,028, filed on Apr. 28, 2011.

(51) Int. Cl.
*H04W 4/00* (2009.01)
*H04B 3/54* (2006.01)
*H04L 12/24* (2006.01)

(52) U.S. Cl.
CPC ............... *H04B 3/544* (2013.01); *Y04S 40/162* (2013.01); *H04L 41/0833* (2013.01)
USPC ........... 370/252; 370/338; 370/315; 370/329; 455/9

(58) Field of Classification Search
CPC . H04W 72/02; H04W 72/04; H04W 72/0406; H04W 72/0413; H04W 72/06; H04L 5/0007; H04L 5/0064; H04L 5/0094; H04L 27/10; H04L 27/30

USPC ................ 370/329, 252, 338, 348, 350, 447; 375/260; 455/434, 500, 67.11
See application file for complete search history.

(56) References Cited

U.S. PATENT DOCUMENTS

| | | | |
|---|---|---|---|
| 2008/0219204 A1* | 9/2008 | Lee et al. ....................... | 370/315 |
| 2008/0232345 A1* | 9/2008 | Espina et al. .................. | 370/350 |
| 2009/0067389 A1* | 3/2009 | Lee et al. ....................... | 370/336 |
| 2009/0190535 A1* | 7/2009 | Hassan et al. ................. | 370/329 |
| 2009/0219852 A1* | 9/2009 | Youn et al. .................... | 370/315 |
| 2009/0245195 A1* | 10/2009 | Bhattad et al. ................ | 370/329 |
| 2009/0247084 A1* | 10/2009 | Palanki ......................... | 455/63.1 |
| 2010/0080114 A1* | 4/2010 | Ratnam et al. ................ | 370/210 |
| 2010/0142365 A1* | 6/2010 | Richardson et al. .......... | 370/210 |

(Continued)

*Primary Examiner* — Dang Ton
*Assistant Examiner* — Sai Aung
(74) *Attorney, Agent, or Firm* — Steven A. Shaw; Frederick J. Telecky, Jr.

(57) ABSTRACT

Systems and methods for designing, using, and/or implementing non-beacon network communications using frequency subbands are described. In various implementations, these systems and methods may be applicable to Power Line Communications (PLC). For example, a method may include transmitting a beacon request message over a given one of a plurality of frequency subbands, receiving a plurality of beacons in response to having transmitted the beacon request message, each of the plurality of beacons received over a respective one of the plurality of frequency subbands, and calculating a downlink quality report based, at least in part, upon the received beacons. The method may also include transmitting the downlink quality report over each of the plurality of frequency subbands and receiving a subband allocation command in response to having transmitted the downlink quality report, the subband allocation command indicating a downlink subband assignment and an uplink subband assignment.

20 Claims, 8 Drawing Sheets

(56) References Cited

U.S. PATENT DOCUMENTS

| | | | |
|---|---|---|---|
| 2010/0177718 A1* | 7/2010 | Harle et al. | 370/329 |
| 2010/0265913 A1* | 10/2010 | Gorokhov et al. | 370/331 |
| 2011/0007653 A1* | 1/2011 | Casaccia et al. | 370/252 |
| 2011/0090880 A1* | 4/2011 | Abraham et al. | 370/338 |
| 2011/0116358 A9* | 5/2011 | Li et al. | 370/203 |

* cited by examiner

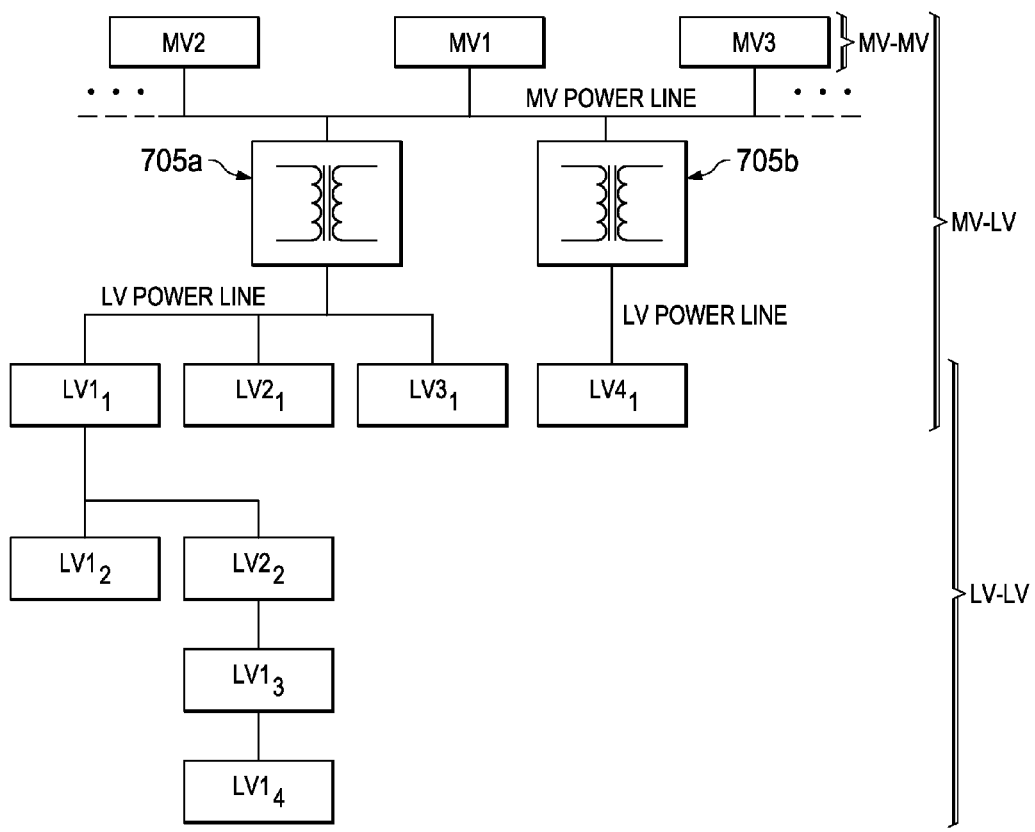

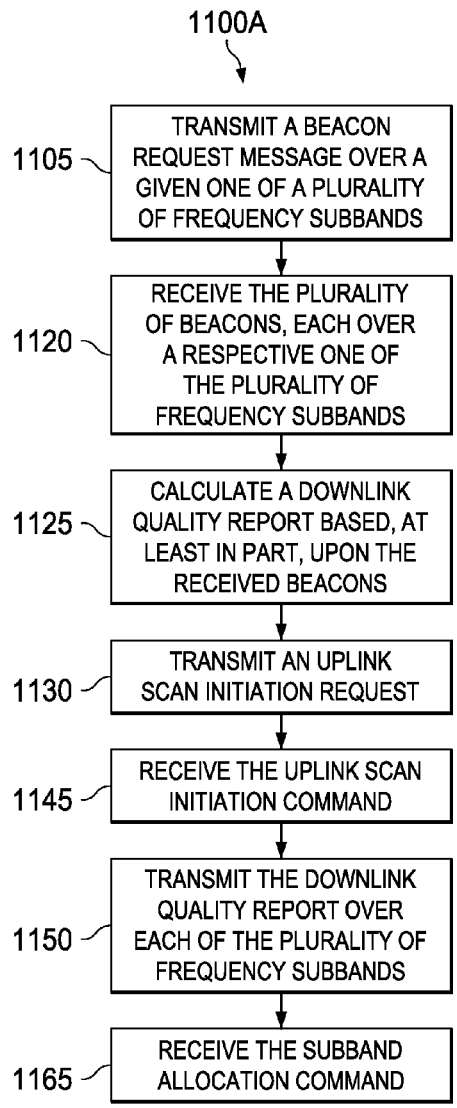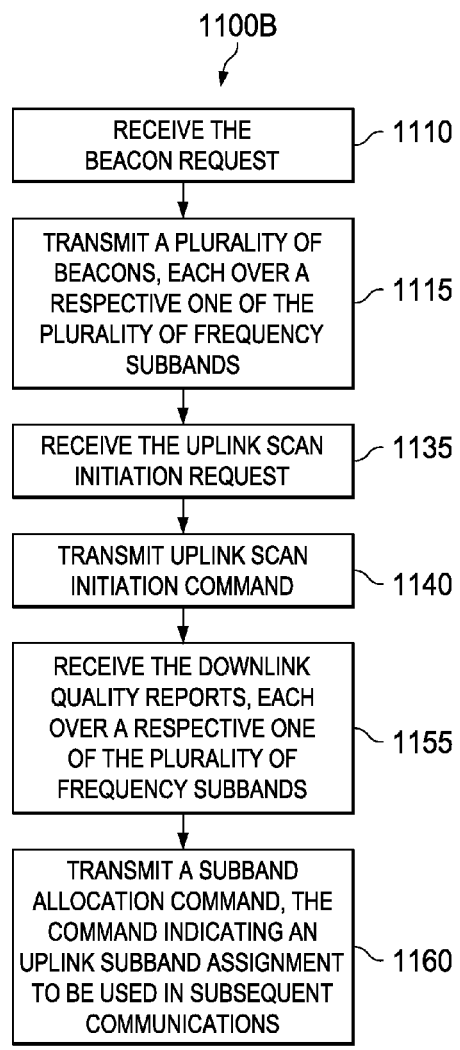
FIG. 11A
FIG. 11B

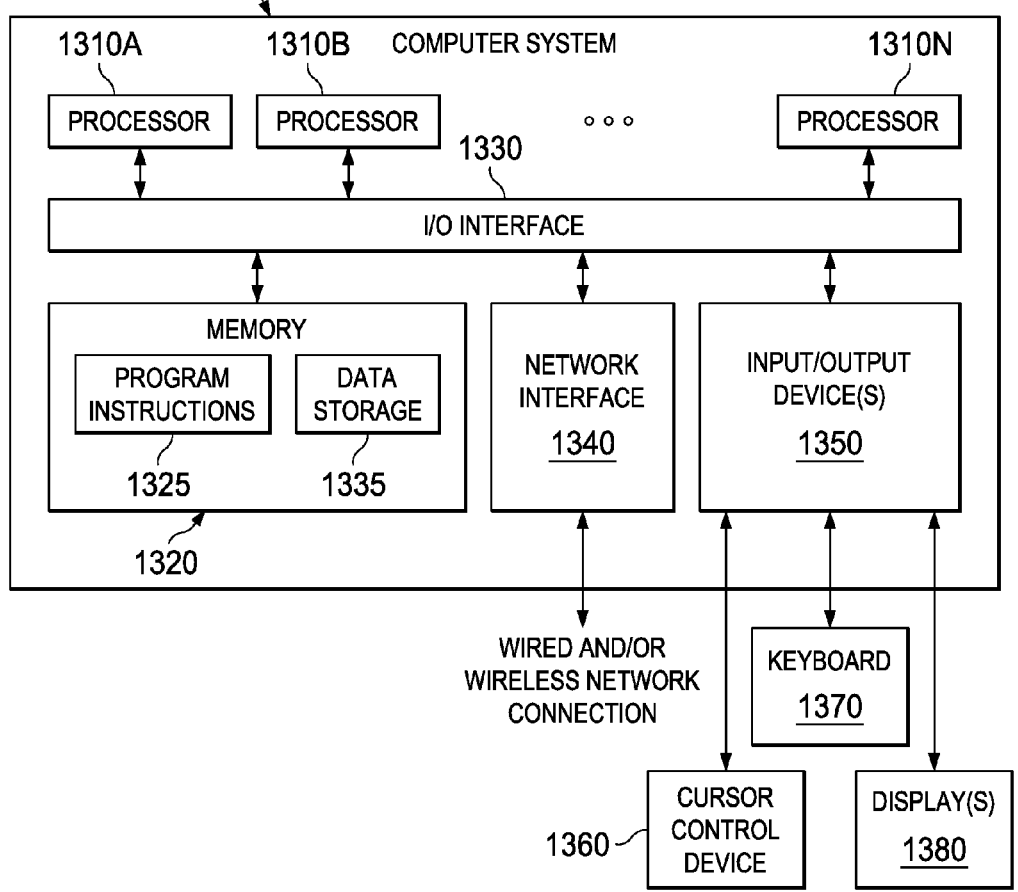

NON-BEACON NETWORK COMMUNICATIONS USING FREQUENCY SUBBANDS

CROSS-REFERENCE TO RELATED APPLICATION

This application claims the benefit of the filing date of U.S. Provisional Patent Application No. 61/480,028 titled "Non Beacon Mode Multi Tone Mask MAC Protocol for MV-LV PLC Networks" and filed Apr. 28, 2011, the disclosure of which is hereby incorporated by reference herein in its entirety.

TECHNICAL FIELD

This specification is directed, in general, to network communications, and, more specifically, to systems and methods for designing, using, and/or implementing non-beacon network communications using frequency subbands.

BACKGROUND

There are several different types of network communications available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing non-beacon network communications using frequency subbands are described. In an illustrative, non-limiting embodiment, a method may include transmitting a beacon request message over a given one of a plurality of frequency subbands, receiving a plurality of beacons in response to having transmitted the beacon request message, each of the plurality of beacons received over a respective one of the plurality of frequency subbands, and calculating a downlink quality report based, at least in part, upon the received beacons. The method may also include transmitting the downlink quality report over each of the plurality of frequency subbands and receiving a subband allocation command in response to having transmitted the downlink quality report, the subband allocation command indicating a downlink subband assignment and an uplink subband assignment.

In some implementations, the beacon request message may indicate a sequence of frequency subbands over which the plurality of beacons is transmitted by other devices that are already a part of the network (e.g., including a data concentrator or the like) and/or a sequence of frequency subbands over which the downlink quality report is transmitted. The downlink quality report may include a downlink channel quality indicator for each of the plurality of subbands (which may be usable by other devices to estimate an uplink quality in each of the plurality of subbands) and/or it may indicate a downlink subband chosen by the communication device among the plurality of plurality of subbands.

Moreover, receiving the subband allocation command may include receiving the allocation command over the chosen downlink subband. For example, the subband allocation command may identify uplink subbands chosen by other devices. Additionally or alternatively, allocated downlink subband assignment may identify an assigned downlink subband that is the same or different than the chosen downlink subband. The method may also include communicating with a PLC device using the downlink subband assignment and the uplink subband assignment.

In another illustrative, non-limiting embodiment, a method may include transmitting, to a PLC data concentrator, a beacon request message over a given one of a plurality of frequency subbands and receive a plurality of beacons from the PLC data concentrator in response to having transmitted the beacon request message, each of the plurality of beacons received over a respective one of the plurality of frequency subbands. The method may also include calculating a downlink quality report based, at least in part, upon the received beacons, and transmitting an uplink scan initiation request to the PLC data concentrator over the given one of the plurality of frequency subbands, the uplink scan initiation request indicating a chosen one of the plurality of frequency subbands.

In some implementations, the method may include receiving an uplink scan initiation command from the PLC data concentrator in response to the uplink scan initiation request over the chosen one of the plurality of frequency subbands, the uplink scan initiation request indicating a downlink subband assignment to be used in subsequent communications. The method may also include transmitting the downlink quality report to the PLC data concentrator over each of the plurality of frequency subbands in response to the uplink scan initiation command. The method may further include receiving a subband allocation command from the PLC data concentrator in response to having transmitted the downlink quality report, the subband allocation command received over the downlink subband assignment, the subband allocation command indicating an uplink subband assignment to be used in subsequent communications.

Additionally or alternatively, in response to not receiving an uplink scan initiation command from the PLC data concentrator, the method may include transmitting another beacon request message to the PLC data concentrator over each of the plurality of subbands, the PLC data concentrator configured to select an uplink subband based, at least in part, upon the other beacon requests.

In yet another illustrative, non-limiting embodiment, a method may include receiving, from a PLC device, a beacon request message over a given one of a plurality of frequency subbands, transmitting a plurality of beacons to the PLC device, each of the plurality of beacons transmitted over a respective one of the plurality of frequency subbands, and receiving a downlink quality report from the PLC device over each of the plurality of frequency subbands. The method may also include transmitting a subband allocation command to the PLC device, the subband allocation command indicating an uplink subband assignment to be used in subsequent communications with the PLC device.

In some implementations, prior to having received the downlink quality report, the method may include receiving an uplink scan initiation request from the PLC device over the given one of the plurality of frequency subbands, the uplink scan initiation request indicating a chosen one of the plurality of frequency subbands suitable for subsequent downlink communications. The method may also include transmitting an uplink scan initiation command to the PLC device in response to the uplink scan initiation request over the chosen one of the plurality of frequency subbands, the uplink scan initiation request indicating a downlink subband assignment to be used in subsequent communications.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
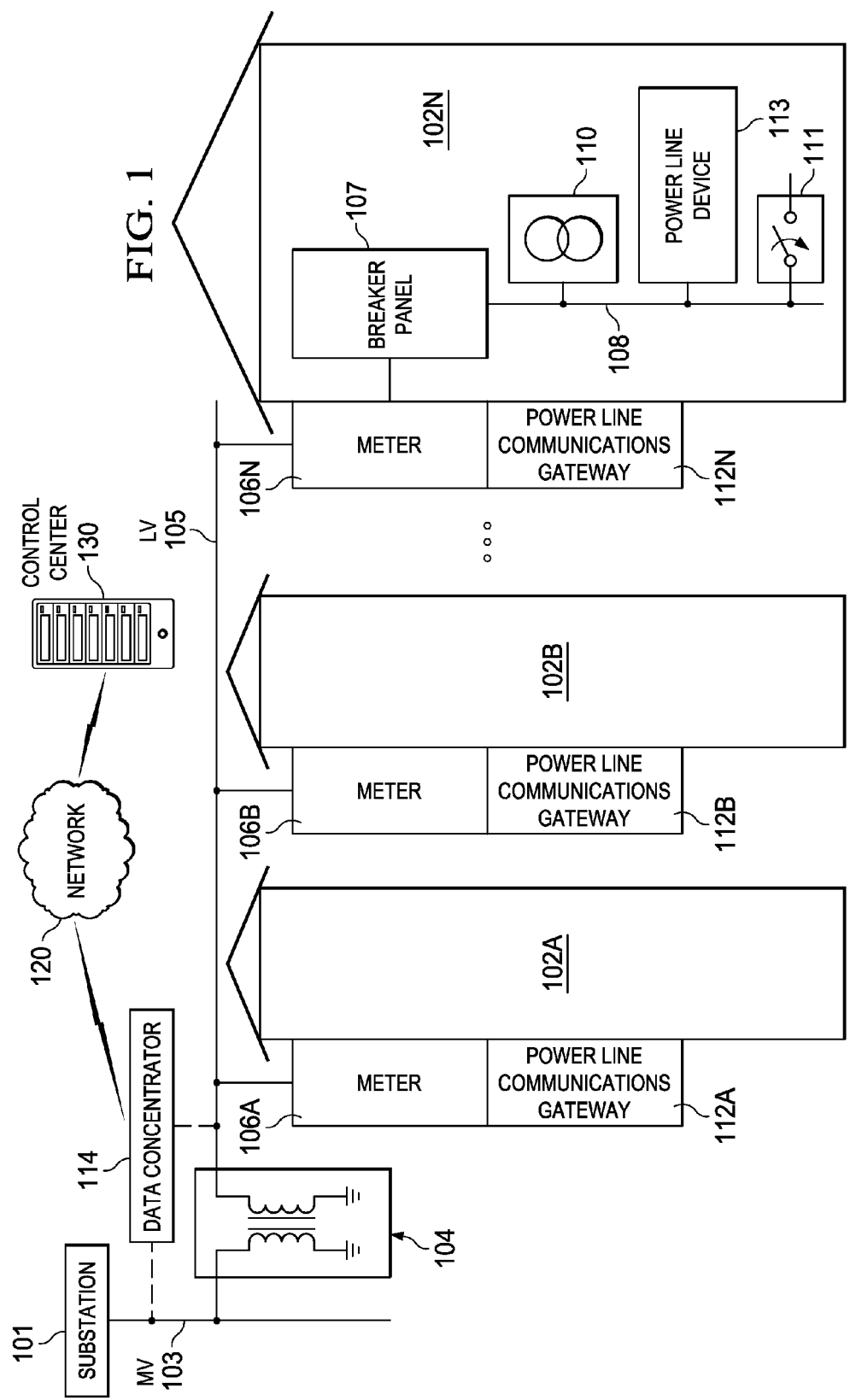

Having thus described the invention(s) in general terms, reference will now be made to the accompanying drawings, wherein:

FIG. 1 is a block diagram of a power line communication (PLC) environment according to some embodiments.

Figure 2:
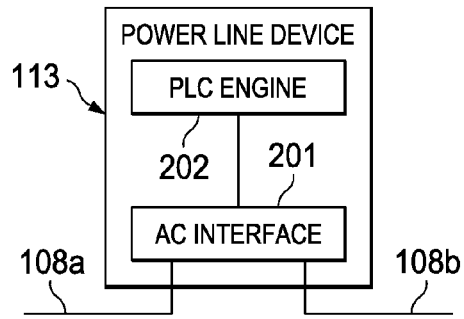

FIG. 2 is a block diagram of a PLC device or modem according to some embodiments.

Figure 3:
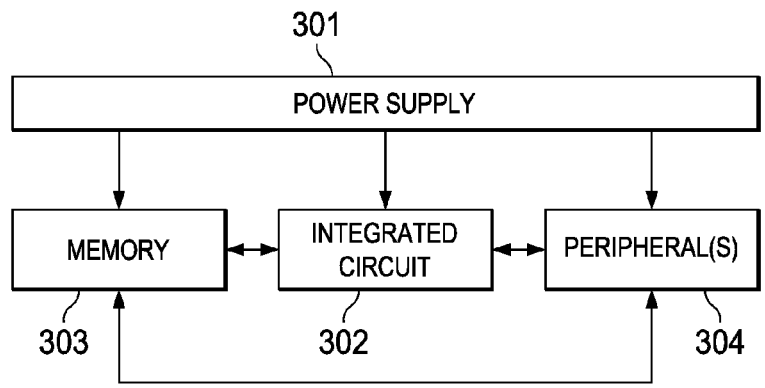

FIG. 3 is a block diagram of an integrated circuit according to some embodiments.

Figure 4:
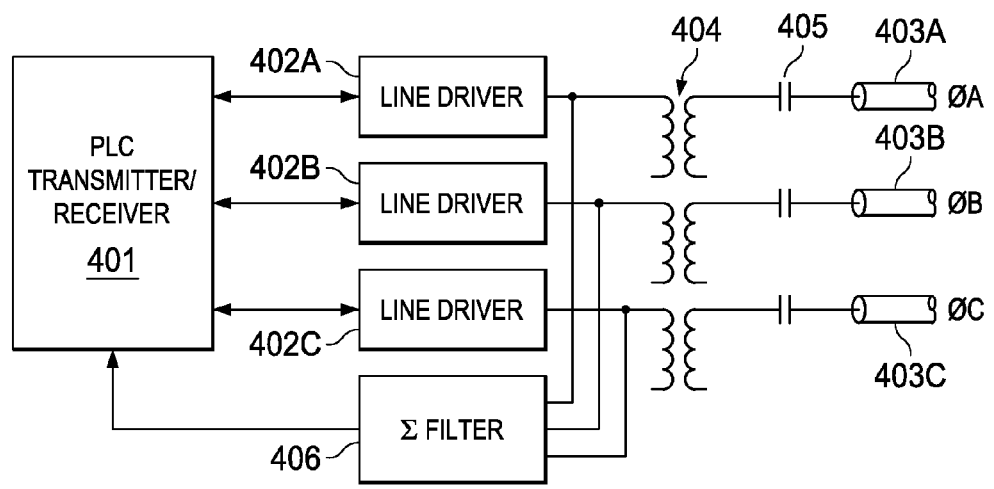
Figure 5:
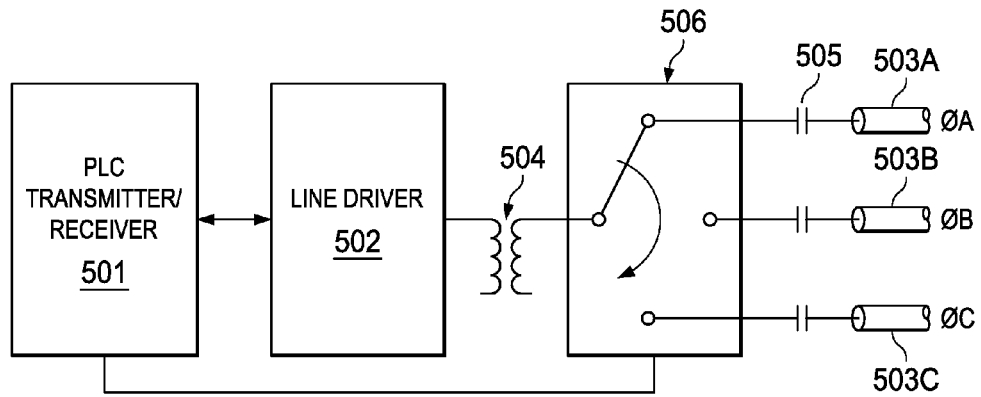
Figure 6:
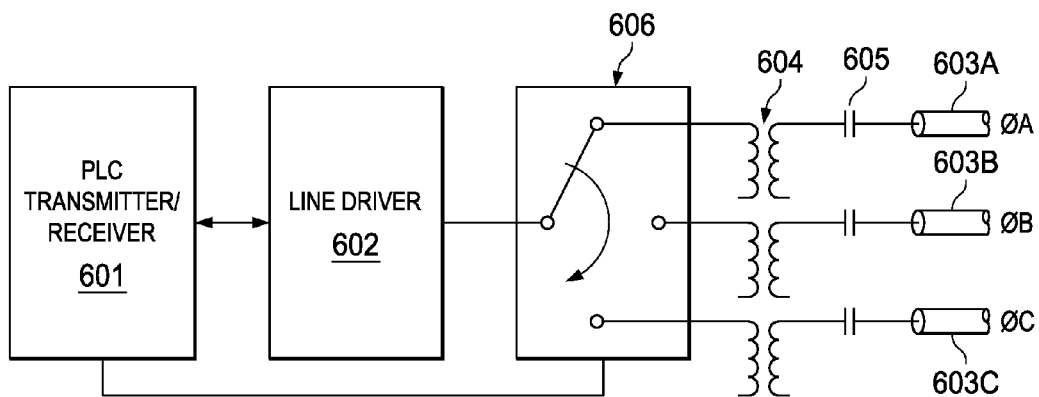

FIGS. 4-6 are block diagrams illustrating connections between a PLC transmitter and/or receiver circuitry to three-phase power lines according to some embodiments.

FIG. 7 is a block diagram of a hierarchical PLC communications network according to some embodiments.

Figure 8:
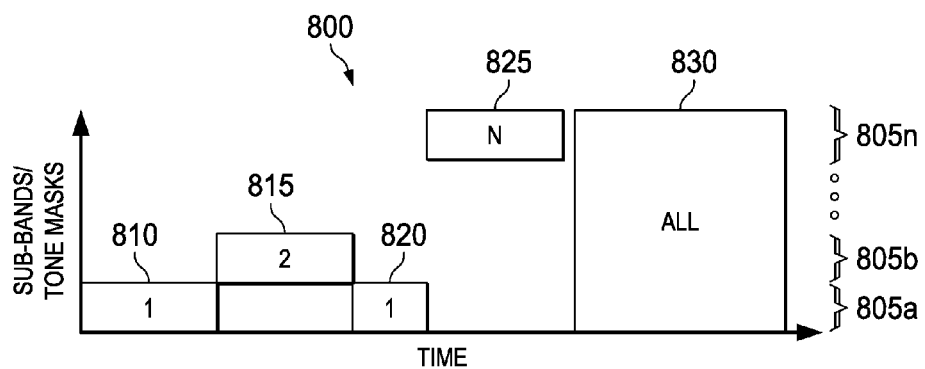

FIG. 8 is a diagram illustrating operation of an MV device using frequency subbands according to some embodiments.

Figure 9A:
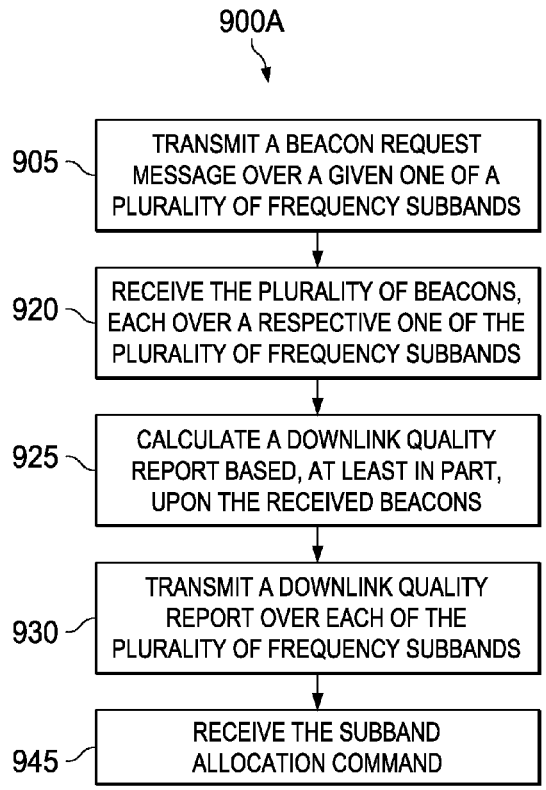
Figure 9B:
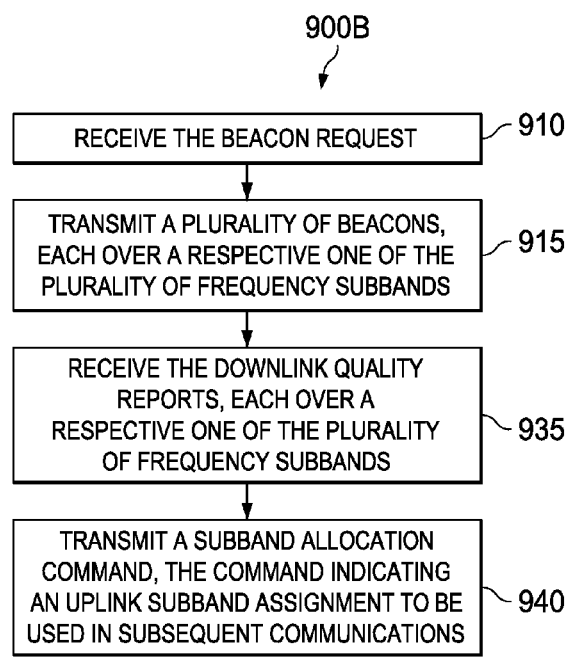

FIGS. 9A and 9B are flowcharts of a first method of scanning frequency subbands in connection with discovery operations from the perspectives of an LV and an MV device, respectively, according to some embodiments.

Figure 10:
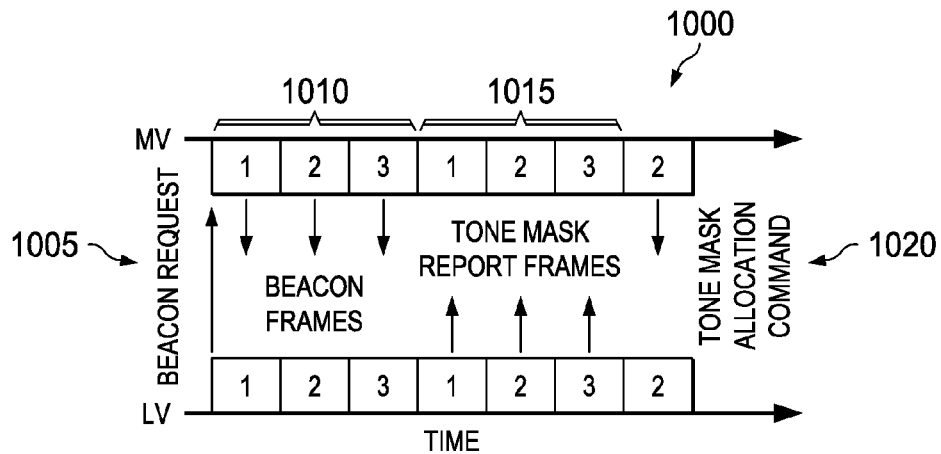

FIG. 10 is a diagram illustrating the first method of scanning frequency subbands according to some embodiments.

FIGS. 11A and 11B are flowcharts of a second method of scanning frequency subbands in connection with discovery operations from the perspectives of an LV and an MV device, respectively, according to some embodiments.

Figure 12:
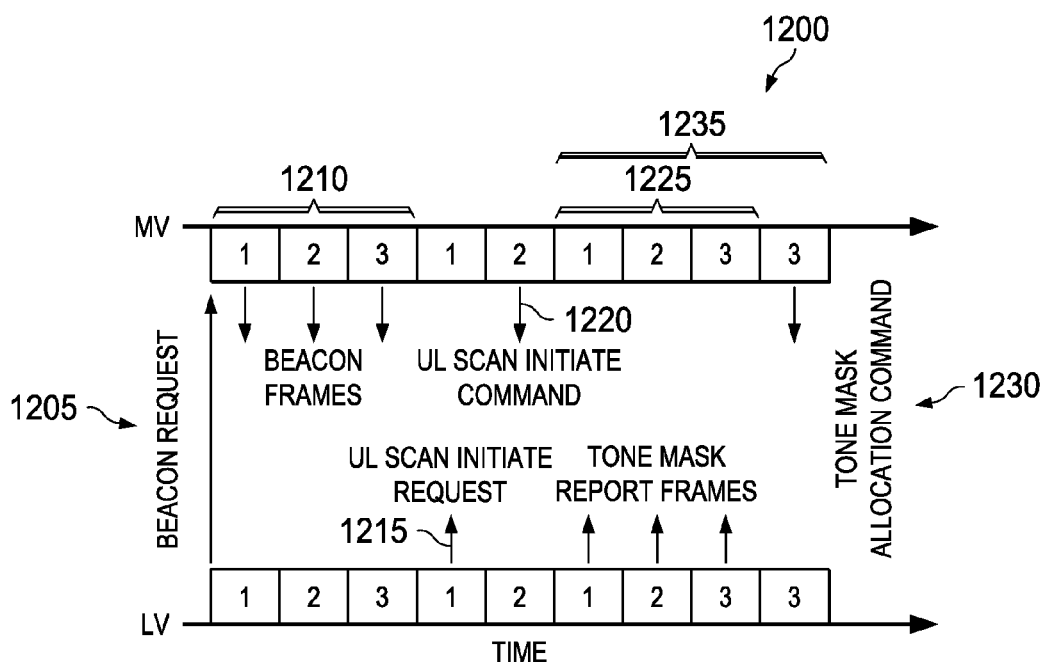

FIG. 12 is a diagram illustrating the second method of scanning frequency subbands according to some embodiments.

FIG. 13 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or non-beacon network communications using frequency subbands. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112*a-n* at residences 102*a-n* use the MV/LV power grid to carry data signals to and from PLC data concentrator 114 without requiring additional wiring. Concentrator 114 may be coupled to either MV line 103 or LV line 105. Modems or gateways 112*a-n* may support applications such as high-speed broadband Internet links, narrowband control applications, low bandwidth data collection applications, or the like. In a home environment, for example, modems or gateways 112*a-n* may further enable home and building automation in heat and air conditioning, lighting, and security. Also, PLC modems or gateways 112*a-n* may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106*a-n*, 112*a-n*, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108*a* and 108*b* inside of premises 112*n* in a manner that allows PLC device 113 to switch the connection between wires 108*a* and 108*b* off using a switching circuit or the like. In other embodiments, however, AC interface 201 may be connected to a single wire 108 (i.e., without breaking wire 108 into wires 108*a* and 108*b*) and without providing such switching capabilities. In operation, AC interface 201 may allow PLC engine 202 to receive and transmit PLC signals over wires 108*a-b*. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 601 is coupled to a single line driver 602. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Turning to FIG. 7 a block diagram of a hierarchical PLC communications network 700 is depicted. In the embodiment shown, medium-voltage (MV) devices or modems MV1, MV2, and MV3 (e.g., PLC data concentrators, routers, etc.) are coupled to an MV power line (e.g., 103 in FIG. 1). First-level low-voltage (LV) devices $LV1_1$, $LV2_1$, $LV3_1$, and $LV4_1$ (e.g., a PLC charger, a PLC meter, a PLC modem, etc.) are coupled to an LV power line (e.g., 105 in FIG. 1) through transformers 705a and 705b (e.g., 104 in FIG. 1). Second-level LV devices $LV1_2$ and $LV2_2$ are coupled to device $LV1_1$. Third-level device $LV1_3$ is coupled to device $LV2_2$, and fourth-level device $LV1_4$ is coupled to device $LV1_3$ (second-, third-, and fourth-level devices may be referred to as "lower-level" devices). It should be noted that network 700 is presented for sake of illustration only, and that in any given implementation may include an arbitrary number of MV and/or LV devices coupled in different ways under a different hierarchy. As illustrated, at least three different types of communication take place in network 700; namely, between MV devices (the "MV-MV network"), between MV devices and first-level LV devices (the "MV-LV network"), and among LV devices (the "LV-LV network").

Within network 700, communications may be achieved between or among devices using one or more different frequency subbands (also referred to as "tone masks" or "channels") in the downlink and uplink directions. Generally speaking, the term "downlink" refers to a communication in a direction that is received by a given device, and the term "uplink" refers to a communication in a direction that is transmitted by that same device. In the case of MV-LV communications, however, the term "downlink" refers to links or communications taking place from an MV device to an LV device, and the term "uplink" refers to links or communications taking place from an LV device to an MV device.

In a typical case, the frequency subband over which an MV device can communicate with an LV device (downlink) may be different from the subband that the LV device may used to communicate with an MV device (uplink). Also, the uplink and downlink subbands may be different between different LV devices communicating with the same MV device. As such, each PLC device involved in a communication may select (or allow another device to select) good or best communication channels or subbands, for example, based upon a determination of channel conditions (e.g., signal-to-noise ratio (SNR) measurements, congestion indicators, etc.) or the like.

In various embodiments, the PLC devices described above (and/or the computer system shown in FIG. 13) may be configured to implement one or more communication techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate communications according to one or more of the techniques illustrated in FIGS. 8-12.

For example, in some implementations, communications between MV1 and MV2 may be performed using poll-based data transfer with carrier sense multiple access (CSMA) or other carrier access (CA) technique. Communications between MV1 and MV3 may be performed using beacon mode CSMA/CA during an allocated time. Communications between MV devices and first-level LV devices may be performed using poll-based Contention Free Period(s) (CFP) over a given frequency subband. Communications between first- and second-level LV devices may be performed using wideband CSMA/CA operations blocked out for periods of time for subband operation, and communications between lower-level LV devices may be performed using wideband CSMA/CA operational at all times. These and other operations are discussed below.

MV Operation

FIG. 8 is a diagram illustrating operation of an MV device using frequency subbands. In some embodiments, one or more MV devices may employ a master-slave approach to poll individual nodes connected to the network. For example, a given MV device may be configured with a maximum number of poll attempts ("aMAXPollAttempts") so that it does not poll the same node more than that maximum number of times over a preselected amount of time (e.g., one second). There may be portions of time during which the MV device does not poll any node, and therefore it remains idle, for example, in wideband ("all"). The MV device may also ensure that it does not stay in a single frequency subband for more than a predetermined period of time ("aMAXSubBand-Time").

Accordingly, an MV device may tune its receiver to different subbands over a period of time, as shown in FIG. 8 for N frequency subbands. As illustrated, the MV device is configured to operate over frequency subbands 805a-n. Block 810 indicates that the MV device is operating over frequency subband 805a for a given period of time, block 815 indicates that the MV device is subsequently operating over frequency subband 805b over a longer period of time, and block 820 shows the MV device operating over frequency subband 805a for a shorter period of time. Block 825 shows the MV device operating over frequency band 805n for the "aMAXSubBandTime," and then it operates over wideband in block 830, also for the maximum allowed amount of time.

In some implementations, the MV device's switching among frequency subbands (e.g., 805a-805b-805a-...-805n), as well as their durations, may be random. Additionally or alternatively, it may follow a selected pattern or sequence of frequency subbands and/or durations. In some cases, the MV device may be capable of tuning its receiver to two or more distinct frequency subbands at the same time (e.g., subbands 805a and 805b), in addition or as an alternative to being able to operate in wideband (i.e., subbands 805a through 805n).

LV-MV Scanning

With respect to LV-MV scanning or discovery, an LV node (e.g., $LV1_1$ shown in FIG. 7) may send a beacon request message, packet, and/or frame over a randomly selected frequency subband. Therefore, an MV device receives the beacon request if it is actually listening on that same randomly selected subband, if the subband is a good or other viable option for communications in the uplink direction, if no collision occurs during the beacon request, and if there is no error otherwise (e.g., due to noise in the channel). In some implementations, the beacon request message or frame may carry information about a sequence of tone masks to be followed during an initial tone mask scanning or discovery operation ("LV tone mask sequence"). Once an MV device receives the beacon request, a tone mask scanning procedure may continue to take place as shown in FIGS. 9 and/or 11.

FIGS. 9A and 9B are flowcharts of a first method of scanning frequency subbands in connection with discovery operations, and FIG. 10 is a diagram illustrating such a method over three frequency subbands, according to some embodiments. Particularly, method 900A illustrates scanning operations from the perspective of an LV device, and method 900B illustrates counterpart scanning operations from the perspective of an MV device. At block 905, the LV device may transmit a beacon request message, packet, or frame 1005 over a randomly selected frequency subband—in this example, subband 1. The beacon request may include an LV tone mask sequence—in this example, the sequence is 1-2-3. As explained above, given that certain receiver and channel conditions are satisfied, the MV device may receive beacon request 1005 at block 910. Thereafter, in response to beacon request 1005, the MV device may transmit a beacon over each of frequency subbands 1010 in the order specified by the beacon request (i.e., 1-2-3) at block 915. At block 920, the LV device may switch its receiver to those same subbands in the same order and may therefore receive beacons 1010.

At block 925, the LV device may calculate a downlink quality report based, at least in part, upon the received beacons. For example, such a report may include a measured or estimated channel or link quality metric (e.g., signal-to-noise ratio or SNR, etc.) for each frequency subband. Still at block 925, the LV device may select one of the frequency subbands suitable for subsequent downlink communications—e.g., it may select the subband with highest SNR or the like, according to the report. In this example, assume that the selected downlink subband is subband 2. Then, at block 930, the LV device may transmit the downlink quality report and/or the selected downlink subband as messages, packets, or frames 1015 over each of the frequency subbands in the same order as the LV tone mask sequence. Alternatively, the LV device may transmit beacon requests over each of the plurality of subbands.

At block 935, the MV device may receive the downlink quality reports 1015 (or beacon requests), and may create an uplink quality report based on those signals. The MV device may also select or assign a downlink subband (based on the downlink quality report or beacon requests), as well as an uplink subband (based on the uplink quality report) to the LV device. As such, at block 940, the MV device may transmit subband allocation command 1020 indicating those assignments to the LV device over the downlink frequency subband chosen by the LV device. At block 945, the LV device may tune its receiver to the chosen subband and it may receive subband allocation command 1020. The LV device may then conduct subsequent communications with the MV device using the assigned downlink and uplink frequency subbands.

In some cases, the MV device may assign a downlink frequency subband to the LV device that is different from the subband chosen by the LV device at block 925. For example, the chosen downlink subband may be subband 2 (over which the mask allocation command is received), but the assigned subband may be subband 1 or 3. Generally speaking, the LV device may select what it perceives to be a good or best downlink subband based on the measured or estimated channel quality metrics. However, the MV device may take other criteria into account such as, for example, the level of congestion in the downlink direction (i.e., whether or how many other devices are already using that subband, etc.), when assigning a downlink subband for future communications. In other words, although the downlink subband assigned by the MV device may be "sub-optimal" from the perspective of the LV device in terms of channel or link quality, it may nonetheless result in better overall network performance.

Typically, when employing the techniques shown in FIGS. 9 and 10, the LV device performs the downlink scan for beacons 1010 regardless of whether the MV device actually receives the beacon request. Similarly, the LV device may also perform the uplink transmission of tone mask reports 1015 even when it does not receive beacons 1010. In some cases, this may cause additional overhead, particularly as the number of frequency subbands increases (along with the duration of the scans). To address these and other concerns, a handshake procedure may be introduced as shown in FIGS. 11 and 12.

Specifically, FIGS. 11A and 11B are flowcharts of a second method of scanning frequency subbands in connection with discovery operations and FIG. 12 is a diagram illustrating such a method over three frequency subbands, according to some embodiments. Similarly as before, here methods 1100A and 1100B illustrate scanning operations from the perspectives of an LV device and an MV device, respectively. At block 1105, the LV device may transmit a beacon request message, packet, or frame 1205 over a randomly selected frequency subband—in this case, subband 1. The beacon request may include an LV tone mask sequence—in this example, the sequence is again 1-2-3. Then, the MV device may receive beacon request 1205 at block 1110. In response to beacon request 1205, the MV device may transmit a beacon over each of frequency subbands 1210 in the order specified by the beacon request (e.g., 1-2-3) at block 1115. At block 1120, the LV device may switch its receiver to those same subbands in the same order and may therefore receive transmitted beacons 1210. At block 1125, the LV device may calculate a downlink quality report based, at least in part, upon the received beacons. The LV device may also select one of the frequency subbands suitable for subsequent downlink communications—in this case, the selected downlink subband is again subband 2.

In contrast with the techniques illustrated in FIGS. 9 and 10, however, methods 1100A and 1100B may include a handshake procedure. At block 1130, the LV device may transmit uplink initiation request 1215 over the same subband used by beacon request 1205 (i.e., subband 1). In some cases, the uplink scan initiation request may inform the MV device that the LV device will be sending the tone mask reports, and it may also inform the MV device about the LV device's chosen downlink subband (i.e., subband 2). At block 1135, the MV device may receive uplink initiation request 1215, and at block 1040 the MV device may transmit uplink scan initiation command 1220 over the LV device's chosen downlink subband (i.e., subband 2). Uplink scan initiate command 1220 may inform the LV device of a downlink subband assignment made by the MV device—in this case, subband 3. As explained above, the downlink subband assignment may be the same or different from the selected downlink subband.

At block 1145, the LV device may receive uplink scan initiate command 1220 and it may transmit the downlink quality report as messages, packets, or frames 1225 over each of the frequency subbands in the same order as the LV tone mask sequence at block 1150. (Similarly as above, the LV device may transmit beacon requests instead of downlink quality reports over each of subband.) At block 1155, the MV device may receive the downlink quality reports 1225 (or beacon requests), and may create an uplink quality report based on those signals. The MV device may also select or assign an uplink subband (based on the uplink quality report) to the LV device. As such, at block 1160, the MV device may transmit subband allocation command 1230 indicating the uplink subband assignment to the LV device over the downlink frequency subband previously assigned via uplink scan initiation command 1220 (in some cases, subband allocation command 1230 may include both the uplink and the downlink assignments). At block 1165, the LV device may tune its receiver to the assigned the downlink frequency subband and it may receive subband allocation command 1230. The LV device may then conduct subsequent communications with the MV device using the assigned downlink and uplink frequency subbands.

Again, compared with the methods described in FIGS. 9 and 10, the methods of FIGS. 11 and 12 may be more suited for communications employing a larger number of subbands. Particularly, the operations shown in block 1235 need not be performed, for example, if the MV and LV devices do not receive the uplink scan initiation request 1215 or uplink scan initiation command 1220, respectively. In that case, the LV device may return to block 1105 and transmit another beacon request (e.g., in another frequency subband). The higher the number of subbands over which tone mask reports 1225 would otherwise have to be transmitted, the better the efficiency of the scanning operations due to the introduction of the handshake procedure. In other words, the relatively small overhead introduced by the handshake procedure may be compensated by the savings in unnecessary uplink scanning time as the number of available frequency subbands increases. It is noted, however, that such a handshake may also be considered "overhead," for example, when the number of subbands is small or when at least one of the beacons usually reaches the LV node in the network.

LV-LV and MV-MV Scanning

In various embodiments, LV-LV scanning (e.g., between two LV devices of the same or different levels) may be performed on wideband (i.e., using all available frequency subbands). A new LV node may send a beacon request on wideband (e.g., periodically) using CSMA/CA or the like. An LV switch node or coordinator (e.g., a first-level LV device) may then respond to beacon request with beacon so long as the LV switch node or coordinator is listening on wideband (in some implementations, first-level devices only), no collision occurred on the beacon request frame, and there is no frame error due to noise in the channel.

The MV-MV scanning procedure may be similar to LV-LV scanning procedure. Specifically, a new MV node may send a beacon request on wideband periodically. An MV coordinator may then respond to beacon requests if: the MV coordinator is listening on wideband, no collision occurred on the beacon request frame, and no frame error due to noise in the channel. In some implementations, MV-MV scanning may always take place over wideband.

Data Transfers (Steady State)

After tone mask selection, a first-level LV device (e.g., $LV1_1$) may listen on its assigned downlink tone mask for poll and/or downlink data, as well as wideband for uplink data from lower-level nodes (e.g., $LV2_2$). For example, $LV1_1$ may use poll-based CFP for uplink data transmissions. An MV device may send a poll command using $LV1_1$'s assigned downlink tone mask and, it may switch to $LV1_1$'s assigned uplink tone mask for any potential reception (e.g., after starting a timer). Prior to responding to the MV device's poll requests, $LV1_1$ may transmit a clear-to-send-to-self ("CTS-2-Self") frame in order to block lower-level devices from transmitting on wideband for the duration of $LV1_1$s uplink transmission. Moreover, $LV1_1$ may respond to the poll request with uplink data on the assigned uplink tone mask. If $LV1_1$ does not have uplink data to transmit, the MV device may time out, and then it may poll other LV devices.

In some implementations, the MV device may transmit data to $LV1_1$ over the assigned downlink tone mask. For example, the MV node may transmit a poll with a time indication for downlink data transmission, so that $LV1_1$ may forward this information in a CTS-2-Self frame to block lower-level LV nodes from transmitting on wideband. Also, because $LV1_1$ is listening on the assigned downlink tone mask by default, it may be able to receive the downlink data following the MV's poll. For uplink acknowledgement ("ACK") transmissions, $LV1_1$ may switch to its assigned uplink tone mask after a downlink data reception to transmit the ACK. Conversely, for downlink ACK transmissions, the MV device may switch to $LV1_1$'s assigned downlink tone mask after an uplink data reception. ACK packets may be transmitted immediately or as block ACK, which may be negotiated during connection setup. In some embodiments, $LV1_1$ may also listen on wideband for any uplink transmissions from lower-level LV devices. If a lower-level LV device transmits while there are no poll-CFP packets, its receiver may be tuned to the wideband.

MV-MV communications may take place similarly as described above. Specifically, MV-MV communication may occur on wideband when there is no polling for MV-LV$1_1$ communication. It may also employ CSMA/CA-based communication on wideband when first-level LV nodes communicate with lower-level LV nodes. Furthermore, the MV coordinator may prevent unnecessary transmissions on wideband when polling for first-level LV nodes by transmitting CTS-2-Self frames for the desired duration (e.g., when operating on a tone-mask). LV-LV communications may also be similar. First-level LV nodes may prevent any unnecessary transmissions on wideband when communicating with MV node by transmitting CTS-2-Self frames for the desired duration (when operating on a tone-mask). At all other times and at third-level and below, communications may employ CSMA/CA-based communication on wideband.

As previously noted, in certain embodiments, systems and methods for designing, using, and/or non-beacon network communications using frequency subbands may be executed, at least in part, by one or more communication devices and/or computer systems. One such computer system is illustrated in FIG. 13. In various embodiments, system 1300 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1300 includes one or more processors 1310 coupled to a system memory 1320 via an input/output (I/O) interface 1330. Computer system 1300 further includes a network interface 1340 coupled to I/O interface 1330, and one or more input/output devices 1325, such as cursor control device 1360, keyboard 1370, display(s) 1380, and/or mobile device 1390. In various embodiments, computer system 1300 may be a single-processor system including one processor 1310, or a multi-processor system including two or more processors 1310 (e.g., two, four, eight, or another suitable number). Processors 1310 may be any processor capable of executing program instructions. For example, in various embodiments, processors 1310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1310 may commonly, but not necessarily, implement the same ISA. Also, in some embodiments, at least one processor 1310 may be a graphics processing unit (GPU) or other dedicated graphics-rendering device.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include any tangible storage media or memory media such as magnetic or optical media—e.g., disk or CD/DVD-ROM coupled to computer system 1300 via I/O interface 1330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, mobile devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement certain embodiments described herein, and data storage 1335, comprising various data accessible by program instructions 1325. In an embodiment, program instructions 1325 may include software elements of embodiments illustrated in the above figures. For example, program instructions 1325 may be implemented in various embodiments using any desired programming language, scripting language, or combination of programming languages and/or scripting languages (e.g., C, C++, C#, JAVA®, JAVASCRIPT®, PERL®, etc.). Data storage 1335 may include data that may be used in these embodiments (e.g., recorded communications, profiles for different modes of operations, etc.). In other embodiments, other or different software elements and data may be included.

A person of ordinary skill in the art will appreciate that computer system 1300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
    performing, using a communication device,
        transmitting a beacon request message over a given one of a plurality of frequency subbands;
        receiving a plurality of beacons in response to having transmitted the beacon request message, each of the plurality of beacons received over the given one of the plurality of frequency subbands;
        calculating a downlink quality report based, at least in part, upon the received beacons, wherein the downlink quality report indicates a downlink subband chosen by the communication device among the plurality of subbands;
        transmitting the downlink quality report over each of the plurality of frequency subbands; and
        receiving a subband allocation command over the chosen downlink subband in response to having transmitted the downlink quality report, the subband allocation command indicating a downlink subband assignment, an uplink subband assignment, and the subband allocation command identifying uplink subbands chosen by other devices, wherein the allocated downlink subband assignment identifies an assigned downlink subband that is the same as the chosen downlink subband.

2. The method of claim 1, wherein the beacon request message indicates a sequence of frequency subbands over which the plurality of beacons is transmitted by other devices that are part of a network.

3. The method of claim 1, wherein the beacon request message indicates a sequence of frequency subbands over which the downlink quality report is transmitted.

4. The method of claim 1, wherein the downlink quality report includes a downlink channel quality indicator for each of the plurality of subbands, the downlink channel quality indicator usable by other devices to estimate an uplink quality in each of the plurality of subbands.

5. The method of claim 1, further comprising:
    performing, using the communication device,
        communicating with another PLC device using the downlink subband assignment and the uplink subband assignment.

6. The method of claim 5, wherein the communication device is a Power Line Communication (PLC) device coupled to a low-voltage (LV) power line, and wherein the other device is a PLC data concentrator coupled to a medium-voltage (MV) power line.

7. A method comprising:
    performing, using a communication device,
        transmitting a beacon request message over a given one of a plurality of frequency subbands;
        receiving a plurality of beacons in response to having transmitted the beacon request message, each of the plurality of beacons received over a respective one of the plurality of frequency subbands;
        calculating a downlink quality report based, at least in part, upon the received beacons;
        transmitting the downlink quality report over each of the plurality of frequency subbands; and
        receiving a subband allocation command over the chosen downlink subband in response to having transmitted the downlink quality report, the subband allocation command indicating a downlink subband assignment, an uplink subband assignment, and the subband allocation command identifying uplink subbands chosen by other devices, wherein the allocated downlink subband assignment identifies an assigned downlink subband different from the chosen downlink subband.

8. A Power Line Communication (PLC) device, comprising:

a processor; and a memory coupled to the processor, the memory configured to store program instructions executable by the processor to cause the configured PLC device to:

transmit, to a PLC data concentrator, a beacon request message over a given one of a plurality of frequency subbands;

receive a plurality of beacons from the PLC data concentrator in response to having transmitted the beacon request message, each of the plurality of beacons received over the given one of the plurality of frequency subbands;

calculate a downlink quality report based, at least in part, upon the received beacons;

transmit an uplink scan initiation request to the PLC data concentrator over the given one of the plurality of frequency subbands, the uplink scan initiation request indicating a chosen one of the plurality of frequency subbands;

receive an uplink scan initiation command from the PLC data concentrator in response to the uplink scan initiation request over the chosen one of the plurality of frequency subbands, the uplink scan initiation request indicating a downlink subband assignment to be used in subsequent communications;

transmit the downlink quality report to the PLC data concentrator over each of the plurality of frequency subbands in response to the uplink scan initiation command; and receive a subband allocation command from the PLC data concentrator in response to having transmitted the downlink quality report, the subband allocation command received over the downlink subband assignment, the subband allocation command indicating an uplink subband assignment to be used in subsequent communications.

9. The PLC device of claim 8, wherein the processor includes a digital signal processor (DSP), an application specific integrated circuit (ASIC), a system-on-chip (SoC) circuit, a field-programmable gate array (FPGA), a microprocessor, or a microcontroller.

10. The PLC device of claim 8, wherein the downlink subband assignment is different from the chosen one of the plurality of frequency subbands.

11. The PLC device of claim 8, wherein the program instructions, upon execution, further cause the PLC device to:

communicate with the PLC data concentrator using the downlink subband assignment and the uplink subband assignment.

12. The PLC device of claim 8, the program instructions further executable by the processor to cause the PLC device to:

in response to not receiving an uplink scan initiation command from the PLC data concentrator, transmit another beacon request message to the PLC data concentrator over each of the plurality of subbands, the PLC data concentrator configured to select an uplink subband based, at least in part, upon the other beacon requests.

13. A non-transitory electronic storage medium having program instructions stored thereon that, upon execution by a processor within a Power Line Communication (PLC) data concentrator, cause the PLC data concentrator to:

receive, from a PLC device, a beacon request message over a given one of a plurality of frequency subbands;

transmit a plurality of beacons to the PLC device, each of the plurality of beacons transmitted over a respective one of the plurality of frequency subbands;

receive a downlink quality report from the PLC device over each of the plurality of frequency subbands; and transmit a subband allocation command to the PLC device, the subband allocation command indicating an uplink subband assignment to be used in subsequent communications with the PLC device;

receive an uplink scan initiation request from the PLC device over the given one of the plurality of frequency subbands prior to having received the downlink quality report, the uplink scan initiation request indicating a chosen one of the plurality of frequency subbands suitable for subsequent downlink communications; and transmit an uplink scan initiation command to the PLC device in response to the uplink scan initiation request over the chosen one of the plurality of frequency subbands, the uplink scan initiation request indicating a downlink subband assignment to be used in subsequent communications.

14. The non-transitory electronic storage medium of claim 13, wherein the downlink subband assignment is different from the chosen one of the plurality of frequency subbands.

15. The non-transitory electronic storage medium of claim 14, wherein the program instructions, upon execution, further cause the PLC data concentrator to:

communicate with PLC device using the downlink subband assignment and the uplink subband assignment.

16. The method of claim 7, wherein the beacon request message indicates a sequence of frequency subbands over which the plurality of beacons is transmitted by other devices that are part of a network.

17. The method of claim 7, wherein the beacon request message indicates a sequence of frequency subbands over which the downlink quality report is transmitted.

18. The method of claim 7, wherein the downlink quality report includes a downlink channel quality indicator for each of the plurality of subbands, the downlink channel quality indicator usable by other devices to estimate an uplink quality in each of the plurality of subbands.

19. The method of claim 7, further comprising:

performing, using the communication device, communicating with another PLC device using the downlink subband assignment and the uplink subband assignment.

20. The method of claim 19, wherein the communication device is a Power Line Communication (PLC) device coupled to a low-voltage (LV) power line, and wherein the other device is a PLC data concentrator coupled to a medium-voltage (MV) power line.

* * * * *